United States Patent
Cazier et al.

(10) Patent No.: US 7,593,023 B2
(45) Date of Patent: Sep. 22, 2009

(54) METHOD AND APPARATUS FOR THE CREATION OF RANDOMIZED CUSTOM IMAGE EFFECTS

(75) Inventors: Robert P. Cazier, Fort Collins, CO (US); Murray D. Craig, Johnstown, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 340 days.

(21) Appl. No.: 11/191,369

(22) Filed: Jul. 27, 2005

(65) Prior Publication Data

US 2007/0024631 A1    Feb. 1, 2007

(51) Int. Cl.
*G09G 5/00* (2006.01)
(52) U.S. Cl. ............... 345/619; 345/419; 345/607; 345/611; 345/581; 382/269
(58) Field of Classification Search .......... 345/619, 345/626, 611, 607, 581, 419; 715/700; 382/144, 382/283, 269
See application file for complete search history.

(56) References Cited

U.S. PATENT DOCUMENTS

| | | | |
|---|---|---|---|
| 5,815,645 A | 9/1998 | Fredlund et al. | |
| 6,011,536 A | 1/2000 | Hertzmann et al. | |
| 6,101,293 A | 8/2000 | McKenzie | |
| 6,154,577 A | 11/2000 | Warnick et al. | |
| 6,285,468 B1* | 9/2001 | Cok et al. | 358/450 |
| 6,317,192 B1 | 11/2001 | Silverbrook et al. | |
| 6,546,397 B1* | 4/2003 | Rempell | 707/102 |
| 6,614,914 B1* | 9/2003 | Rhoads et al. | 382/100 |
| 6,671,387 B1 | 12/2003 | Chen et al. | |
| 6,717,613 B1* | 4/2004 | Osa | 348/222.1 |
| 6,724,913 B1 | 4/2004 | Chen et al. | |
| 6,775,407 B1 | 8/2004 | Gindele et al. | |
| 6,790,143 B2* | 9/2004 | Crumby | 463/42 |
| 6,795,585 B1 | 9/2004 | Parada et al. | |
| 6,845,365 B2* | 1/2005 | von Rosen et al. | 705/27 |
| 7,113,615 B2* | 9/2006 | Rhoads et al. | 382/100 |
| 7,119,836 B2* | 10/2006 | Silverbrook | 348/207.2 |
| 7,243,842 B1* | 7/2007 | Leon et al. | 235/381 |
| 7,272,265 B2* | 9/2007 | Kouri et al. | 382/260 |
| 7,319,775 B2* | 1/2008 | Sharma et al. | 382/100 |
| 7,346,208 B2* | 3/2008 | Staelin et al. | 382/157 |
| 2002/0054224 A1* | 5/2002 | Wasula et al. | 348/232 |
| 2003/0021439 A1* | 1/2003 | Lubin et al. | 382/100 |
| 2003/0035586 A1* | 2/2003 | Chou et al. | 382/233 |
| 2003/0088785 A1* | 5/2003 | Fujiwara et al. | 713/191 |
| 2003/0117496 A1* | 6/2003 | Silverbrook | 348/207.2 |
| 2003/0139886 A1* | 7/2003 | Bodzin et al. | 702/28 |

(Continued)

OTHER PUBLICATIONS

M. Mattavelli, O. Bruyndonckx, S. Comes, B. Macq with title of "Post-processing of coded images by neural network cancellation of the unmasked noise" Neural Processing Letters, vol. 2, No. 2, 18-22, 1995.*

*Primary Examiner*—Javid A Amini

(57) ABSTRACT

An image capture device includes a processor configured to generate pseudo-random numbers. Optionally, these pseudo-random numbers may use a portion of an image as a seed for the random number generator. These random numbers are used in the post-processing of digital images to create a variety pseudo-random image effects such as; unique frame colors, line thicknesses, line and/or shape placements, image copies, filter strengths, shape choices and color blends. These effects are applied to a selected digital image creating a unique final image.

30 Claims, 3 Drawing Sheets

U.S. PATENT DOCUMENTS

| | | | |
|---|---|---|---|
| 2004/0022444 A1* | 2/2004 | Rhoads | 382/232 |
| 2004/0258308 A1* | 12/2004 | Sadovsky et al. | 382/190 |
| 2004/0263640 A1 | 12/2004 | Silverbrook | |
| 2005/0114801 A1* | 5/2005 | Yang et al. | 715/961 |
| 2005/0185055 A1* | 8/2005 | Miller et al. | 348/207.1 |
| 2006/0007243 A1* | 1/2006 | Miller | 345/619 |
| 2006/0244845 A1* | 11/2006 | Craig et al. | 348/231.3 |
| 2006/0245670 A1* | 11/2006 | Cazier et al. | 382/298 |
| 2007/0011023 A1* | 1/2007 | Silverbrook | 705/1 |

* cited by examiner

METHOD AND APPARATUS FOR THE CREATION OF RANDOMIZED CUSTOM IMAGE EFFECTS

FIELD OF THE INVENTION

The present invention relates generally to the field of image post-processing, and more particularly to the field of randomized effects applied to digital images.

BACKGROUND OF THE INVENTION

Currently available image capture devices allow users to capture large quantities of photos quickly and easily. Unfortunately, they allow the user little flexibility in personalizing or customizing the photos to their preferences. Current post-processing available in digital cameras is typically limited to applying an essentially non-unique method to apply effects. For example, post-processing to "antiqueize" a photo may involve converting the image to a sepia tone and adding scratches to the image. However, every photo that is "antiqueized" will have scratches in the same places, making a folio of such images look ridiculous. In viewing a single "antiqueized" image, the scratches may appear random, however when viewing two or more together it quickly becomes apparent how the effect was achieved.

Presently, users may apply post-processing techniques by hand to produce a wider variety of effects. However, this is time consuming and also most post-processing products have a steep learning curve, requiring the user to spend significant time learning to use the tool.

SUMMARY OF THE INVENTION

An image capture device includes a processor configured to generate pseudo-random numbers. Optionally, these pseudo-random numbers may use a portion of an image as a seed for the random number generator. These random numbers are used in the post-processing of digital images to create a variety pseudo-random image effects such as; unique frame colors, line thicknesses, line and/or shape placements, image copies, filter strengths, shape choices and color blends. These effects are applied to a selected digital image creating a unique final image.

Other aspects and advantages of the present invention will become apparent from the following detailed description, taken in conjunction with the accompanying drawings, illustrating by way of example the principles of the invention.

DETAILED DESCRIPTION

Figure 1:
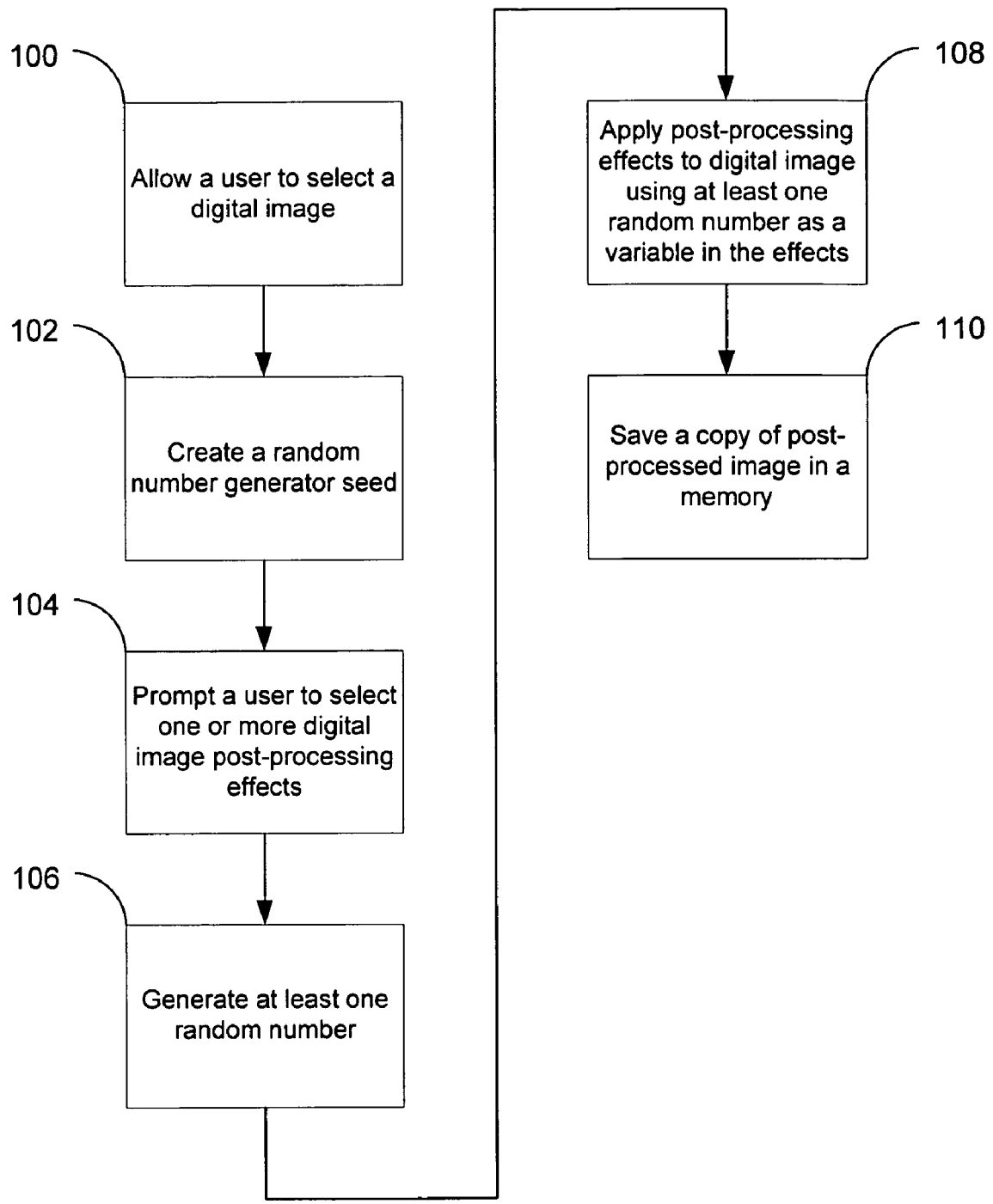
FIG. 1 is flowchart of an example embodiment of a method for the creation of randomized custom image effects according to the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1 is flowchart of an example embodiment of a method for the creation of randomized custom image effects according to the present invention. In a step 100, an image capture device allows a user to select one or more digital images. In a step 102, the image capture device creates a random number generator seed. In some embodiments of the present invention the current date and time may be used as a seed. Since the current time is continually changing, this generates different seeds at different times. Other embodiments of the present invention use some or all of the image data from the selected digital image to create a random number generator seed. Since different images contain different image data, this will create different seeds from different images, while any individual image will result in reproducible effects (as long as the same portion of the image data is used to create the seed.) However, this method will not work for a user who wishes to apply randomized custom image effects multiple times to a single image for the purpose of selecting the best final image from the set of images resulting from the multiple applications of the present invention to a single image. Those of skill in the art will recognize, that a wide variety of methods exist for the creation of a random number generator seed, all within the scope of the present invention. In a step 104, the image capture device allows the user to select one or more digital post-processing effects for application to the selected digital image. Those of skill in the art will recognize that a very wide variety of digital image post-processing effects may make use of random variables in the application of these effects to digital images all within the scope of the present invention. For example, the random numbers may be used as a parameter in post-processing effects to create unique frame colors, unique line thicknesses (for example in a border), unique line and/or shape placements, unique image copies (for example in a tiling effect), unique filter strengths, unique shape choices (for example for shapes or objects overlaid on the image), unique textures (for borders and overlays), and unique color blends.

In a step 106, the image capture device generates at least one random number. Those of skill in the art will recognize that it is extremely difficult to generate a sequence of truly random numbers. Most algorithms provide for the generation of pseudo-random number sequences, and within this document the term "random number" is meant to include such pseudo-random numbers. Those of skill in the art will also recognize that a wide variety of random number generator algorithms may be used within the scope of the present invention. In a step 108, the image capture device applies post-processing effects to the selected digital image using at least one random number as a variable in the application of the effects. In a step 110, the final post-processed image is stored in a memory.

Figure 2A:
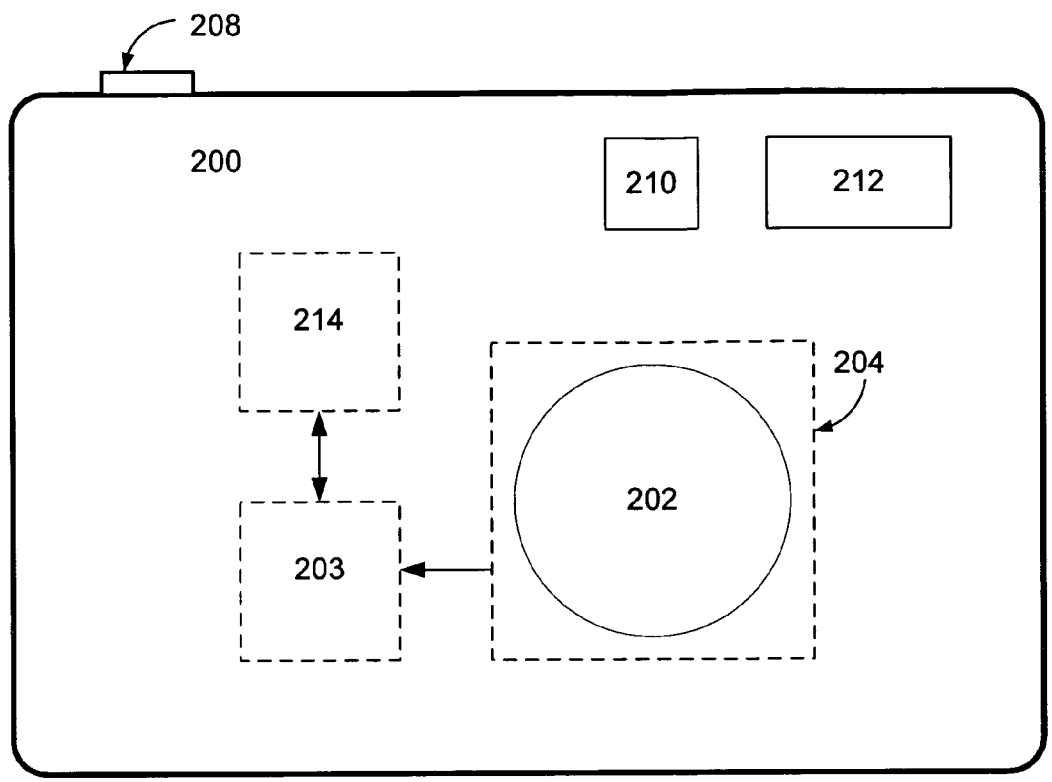
FIG. 2A is a front view of an example embodiment of a device for the creation of randomized custom image effects according to the present invention.

FIG. 2A is a front view of an example embodiment of a device for the creation of randomized custom image effects according to the present invention. In this example embodiment of the present invention, a body 200, including a lens 202, an image sensor 204, such as a CCD or CMOS sensor, a memory 206, a shutter button 208, an optical viewfinder 210, and a strobe 212, is configured to create randomized custom image effects. This digital camera 200 also includes a processor 214, electrically coupled with the memory 206, configured to create randomized custom image effects using the method described above and shown in the flowchart of FIG. 1. Those of skill in the art will recognize that a digital camera is but one of a variety of image capture devices that may be configured to create randomized custom image effects from a digital image within the scope of the present invention.

Figure 2B:
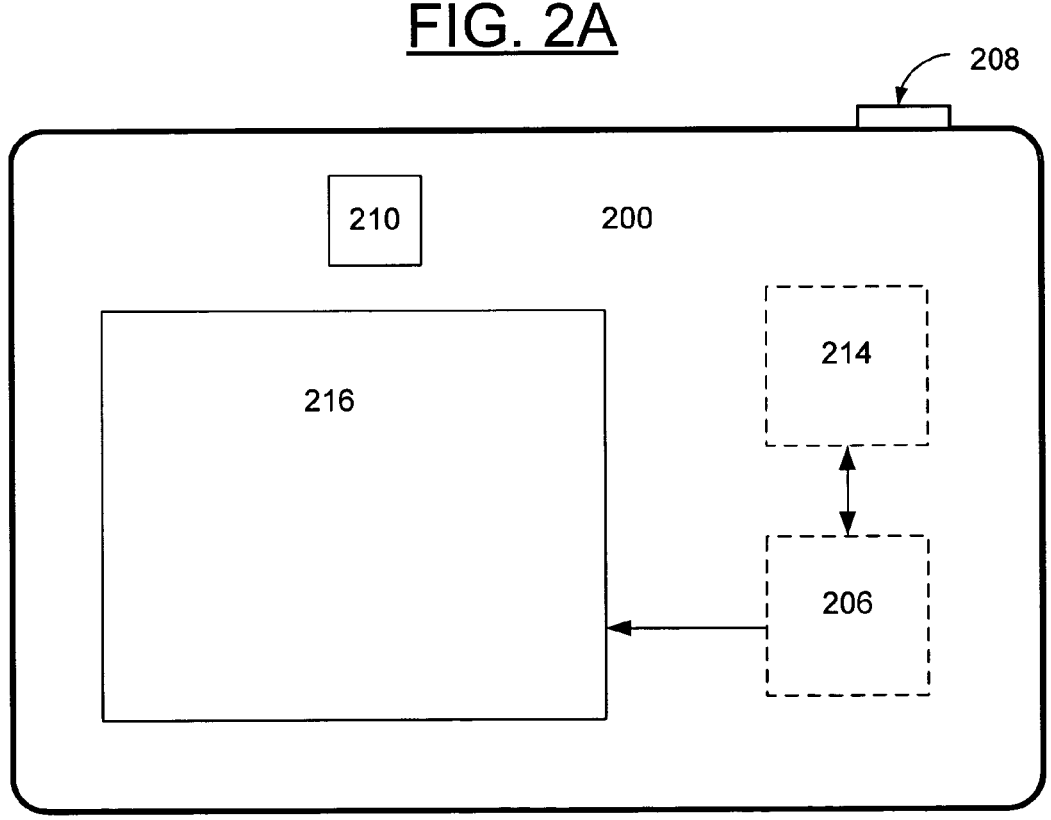
FIG. 2B is a rear view of an example embodiment of a device for the creation of randomized custom image effects according to the present invention.

FIG. 2B is a rear view of an example embodiment of a device for the creation of randomized custom image effects according to the present invention. In this example embodiment of the present invention, the body 200, also includes a viewfinder display 216, such as an LCD display used to show viewfinder images and other information such as user interface menus for control of the digital camera, and the customized random image effects.

Figure 3:
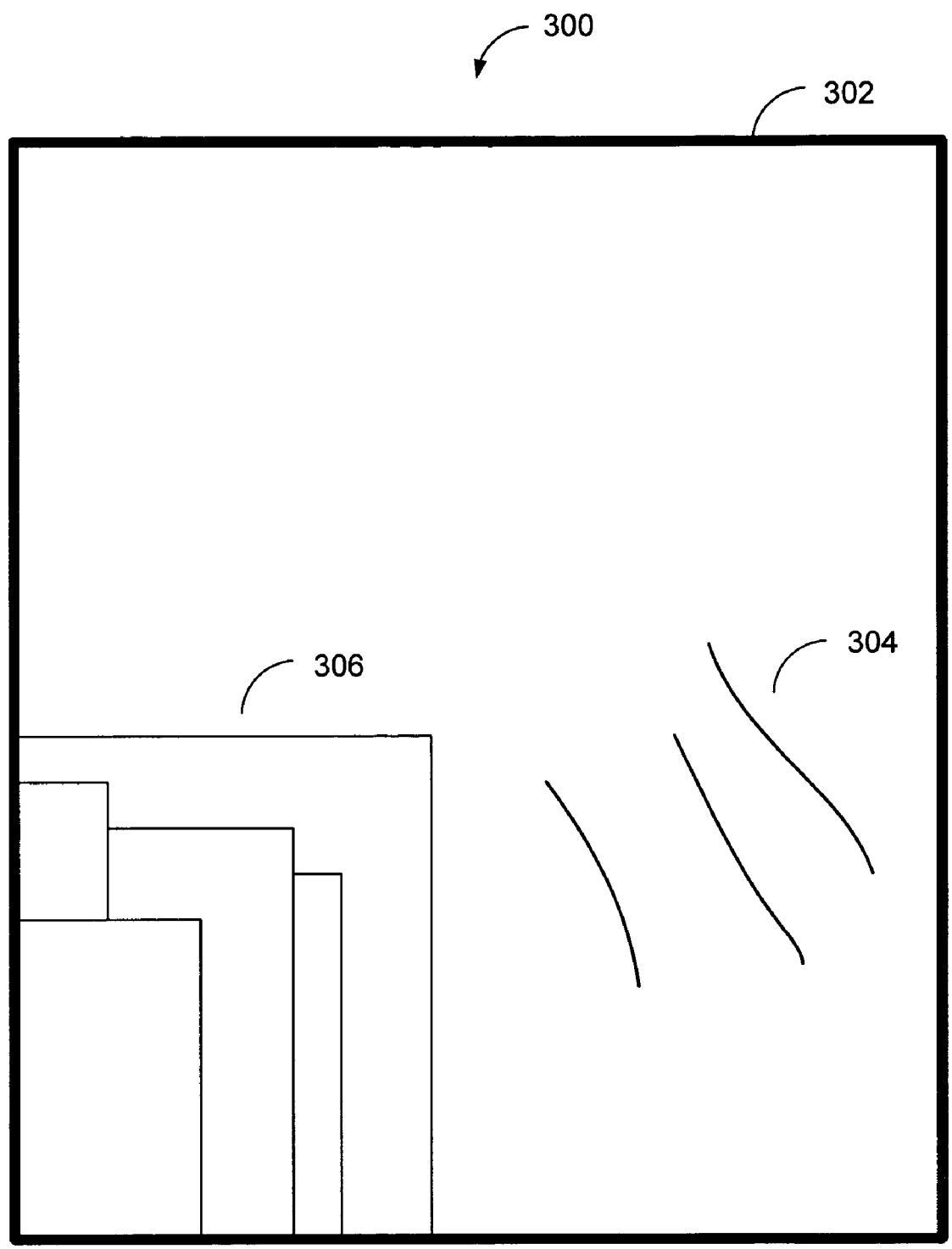
FIG. 3 is an example representation of several of the possible randomized custom image effects that may be applied to a digital image according to the present invention.

FIG. 3 is an example representation of several of the possible randomized custom image effects that may be applied to a digital image according to the present invention. In this example image 300, several randomized custom image effects are illustrated. For example the image frame 302, may have its thickness, texture, and color determined randomly according to the present invention. The group of scratches 304 applied over the image may have their line thickness, density, color, shape, texture, and frequency determined randomly according to the present invention. The group of shapes 306 applied over the image may have their line thickness, color, shape, texture, and frequency determined randomly according to the present invention. Those of skill in the art will recognize that this figure illustrates a very small subset of all of the possible digital image post-processing effects that may use randomized parameters in their creation and application all within the scope of the present invention.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for the creation of randomized custom image effects comprising the steps of:
    a) allowing a user to select a digital image stored in an electronic device;
    b) creating plural different random number generator seeds at different times using a digital processor operating on the electronic device, wherein a basis for the different random number generator seeds are continually changing and are created at the different times;
    c) allowing a user to select one or more digital image post-processing effects, wherein each post-processing effect has a subset of image altering effects including application frequency;
    d) generating at least one random number using the digital processor operating on the electronic device;
    e) creating pseudo-random post-processing effects, when selected, to the selected digital image using the at least one random number as a variable in the application of the post-processing effects and the subset of image altering effects, wherein the post-processing effects are changed with associated changes in the plural different random number generator seeds and the application frequency of the subset of image altering effects; and
    f) saving a copy of the post-processed digital image in a memory.

2. The method recited by claim 1,
wherein said step of creating a random number generator seed uses the current date to create the random number generator seed.

3. The method recited by claim 1,
wherein said step of creating a random number generator seed uses image data from the selected image to create the random number generator seed.

4. The method recited by claim 1,
wherein said step of applying the selected post-processing effects uses the at least one random number to vary a line thickness.

5. The method recited by claim 1,
wherein said step of applying the selected post-processing effects uses the at least one random number to vary a line color.

6. The method recited by claim 1,
wherein said step of applying the selected post-processing effects uses the at least one random number to vary a frame thickness.

7. The method recited by claim 1,
wherein said step of applying the selected post-processing effects uses the at least one random number to vary a frame color.

8. The method recited by claim 1,
wherein said step of applying the selected post-processing effects uses the at least one random number to vary a line placement.

9. The method recited by claim 1,
wherein said step of applying the selected post-processing effects uses the at least one random number to vary a shape placement.

10. The method recited by claim 1,
wherein said step of applying the selected post-processing effects uses the at least one random number to vary a quantity of image copies in an image tiling effect.

11. The method recited by claim 1,
wherein said step of applying the selected post-processing effects uses the at least one random number to vary a filter strength.

12. The method recited by claim 1,
wherein said step of applying the selected post-processing effects uses the at least one random number to vary a filter color.

13. The method recited by claim 1,
wherein said step of applying the selected post-processing effects uses the at least one random number to vary shapes of objects used in the effect.

14. The method recited by claim 1,
wherein said step of applying the selected post-processing effects uses the at least one random number to vary color blends.

15. The method recited by claim 1, wherein said step of applying the selected post-processing effects uses the at least one random number to vary a texture.

16. An image capture device comprising:
a body;
a memory configured to store digital images; and
a processor within said body, electrically coupled to said memory, configured to:
  allow a user to select a digital image;
  create plural different random number generator seeds at different times, wherein a basis for the different random number generator seeds are continually changing and are created at the different times;
  allow a user to select one or more digital image post-processing effects, wherein each post-processing effect has a subset of image altering effects including application frequency;
  generate at least one random number;
  creating pseudo-random post-processing effects, when selected, to the selected digital image using the at least one random number as a variable in the application of the post-processing effects and the subset of image altering effects, wherein the post-processing effects are changed with associated changes in the plural different random number generator seeds and the application frequency of the subset of image altering effects; and
  save a copy of the post-processed digital image in said memory.

17. The image capture device recited by claim 16, wherein said processor is also configured to create a random number generator seed using the current date and time to create the random number generator seed.

18. The image capture device recited by claim 16, wherein said processor is also configured to create a random number generator seed using image data from the selected image to create the random number generator seed.

19. The image capture device recited by claim 16, wherein said processor is also configured to apply the selected post-processing effects using the at least one random number to vary a line thickness.

20. The image capture device recited by claim 16, wherein said processor is also configured to apply the selected post-processing effects using the at least one random number to vary a line color.

21. The image capture device recited by claim 16, wherein said processor is also configured to apply the selected post-processing effects using the at least one random number to vary a frame thickness.

22. The image capture device recited by claim 16, wherein said processor is also configured to apply the selected post-processing effects using the at least one random number to vary a frame color.

23. The image capture device recited by claim 16, wherein said processor is also configured to apply the selected post-processing effects using the at least one random number to vary a line placement.

24. The image capture device recited by claim 16, wherein said processor is also configured to apply the selected post-processing effects using the at least one random number to vary a shape placement.

25. The image capture device recited by claim 16, wherein said processor is also configured to apply the selected post-processing effects using the at least one random number to vary a quantity of image copies in an image tiling effect.

26. The image capture device recited by claim 16, wherein said processor is also configured to apply the selected post-processing effects using the at least one random number to vary a filter strength.

27. The image capture device recited by claim 16, wherein said processor is also configured to apply the selected post-processing effects using the at least one random number to vary a filter color.

28. The image capture device recited by claim 16, wherein said processor is also configured to apply the selected post-processing effects using the at least one random number to vary shapes of objects used in the effect.

29. The image capture device recited by claim 16, wherein said processor is also configured to apply the selected post-processing effects using the at least one random number to vary color blends.

30. The image capture device recited by claim 16, wherein said processor is also configured to apply the selected post-processing effects using the at least one random number to vary a texture.

* * * * *